United States Patent
Mo et al.

(10) Patent No.: US 7,289,429 B2
(45) Date of Patent: Oct. 30, 2007

(54) SYSTEM AND METHOD TO PERFORM NON-SERVICE EFFECTING BANDWIDTH RESERVATION USING A RESERVATION SIGNALING PROTOCOL

(75) Inventors: Li Mo, Plano, TX (US); Jennifer J. Liu, Plano, TX (US); Abinder S. Dhillon, Allen, TX (US); Nimer Yaseen, Allen, TX (US); Xiao Hu, Carrollton, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 719 days.

(21) Appl. No.: 09/978,971

(22) Filed: Oct. 15, 2001

(65) Prior Publication Data

US 2003/0037276 A1    Feb. 20, 2003

Related U.S. Application Data

(60) Provisional application No. 60/295,141, filed on Jun. 1, 2001.

(51) Int. Cl.
*G08C 15/00*  (2006.01)
*G02F 2/00*  (2006.01)

(52) U.S. Cl. ............................ 370/217; 370/221; 398/2

(58) Field of Classification Search ........ 370/216–218, 370/221–228, 230.1, 229–231, 235, 237, 370/238, 242, 248, 249, 389, 392
See application file for complete search history.

(56) References Cited

U.S. PATENT DOCUMENTS

| | | | | |
|---|---|---|---|---|
| 5,550,805 | A * | 8/1996 | Takatori et al. | 370/222 |
| 5,862,125 | A * | 1/1999 | Russ | 370/228 |
| 5,959,969 | A | 9/1999 | Croslin et al. | |
| 6,112,249 | A * | 8/2000 | Bader et al. | 714/4 |
| 6,163,527 | A | 12/2000 | Ester et al. | |
| 6,173,411 | B1 | 1/2001 | Hirst et al. | |
| 6,446,219 | B2 | 9/2002 | Slaughter et al. | |
| 6,487,678 | B1 | 11/2002 | Briskey et al. | |
| 6,490,693 | B1 | 12/2002 | Briskey et al. | |
| 6,549,513 | B1 * | 4/2003 | Chao et al. | 370/227 |
| 6,862,288 | B2 * | 3/2005 | Sharma et al. | 370/403 |
| 2002/0004843 | A1 * | 1/2002 | Andersson et al. | 709/238 |
| 2002/0172149 | A1 * | 11/2002 | Kinoshita et al. | 370/216 |

OTHER PUBLICATIONS

Sangsik Yoon, An Efficient Recorvery Mechanism for MPLS-based protection LSP. Apr. 2001, IEEE, pp. 75-79.*
Gaeil Ahn, Simulator for MPLS Path Restoration and Performance Evaluation. Apr. 2001, IEEE, pp. 32-36.*
Chuck Semeria, RSVP Signaling Extensions for MPLS traffic Engineering. 2000, Juniper Networks, pp. 1-29.*
Vishal Sharma, Extensions to RSVP-TE for MPLS Path protection, Nov. 2000, IETF, pp. 1-14.*

(Continued)

*Primary Examiner*—Steven Nguyen
(74) *Attorney, Agent, or Firm*—Gardere Wynne Sewell LLP

(57) ABSTRACT

A method to facilitate recovery of a node in a communications network is disclosed. The method comprises receiving one or more messages from at least another node in the communications network and restoring connectivity of a recovering node based at least in part on the received messages.

22 Claims, 3 Drawing Sheets

OTHER PUBLICATIONS

Ken Owens, A path protection/restoration mechanism for MPLS networks, Nov. 2000, IETF, pp. 1-24.*

Vishal Sharma, Framework for MPLS-based recovery, Mar. 2001, IETF, pp. 1-36.*

World Wide Web, http://www.cis.ohio-state.edu/~jain/cis788-97/virtual_lans/index.htm, Suba Varadarajan, "Virtual Local Area Networks", printed on Feb. 7, 2000, 12 pages.

World Wide Web, http://www.ietf.org/internet-drafts/draft-ietf-mpls-arch-07.txt, Eric C. Rosen, "Multiprotocol Label Switching Architucture", printed on Jan. 9, 2001, 55 pages.

World Wide Web, http://www.ietf.org/internet-drafts/draft-ietf-mpls-generalized-rsvp-te-00Peter Ashwood-Smith, et al., "Generalized MPLS Signaling -RSVP-TE Extensions", printed on Jan. 9, 2001, 19 pages.

Yates, Jennifer, et al., "Reconfiguration in IP Over WDM Access Networks", AT&T Labs—Research, AT&T Shannon Laboratories, 4 pages.

Copyright 2000 by the Institute of Electrical and Electronics Engineers, Inc., "Local and Metropolitan Area Networks", IEEE Standard for Information technology, published Oct. 16, 2000, pp. 40-50.

* cited by examiner

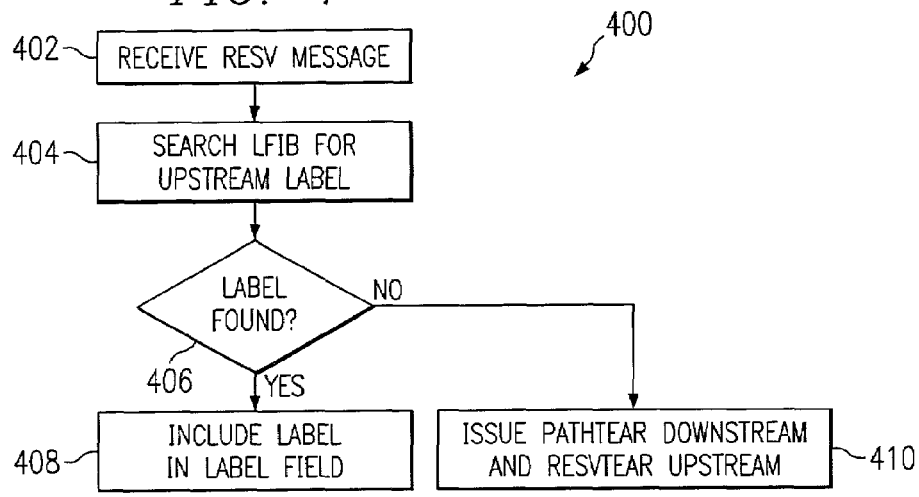
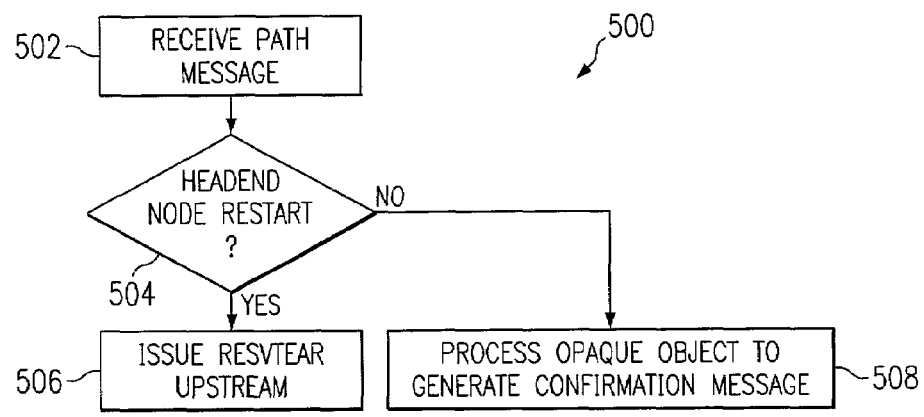

SYSTEM AND METHOD TO PERFORM NON-SERVICE EFFECTING BANDWIDTH RESERVATION USING A RESERVATION SIGNALING PROTOCOL

This application claims priority to U.S. Provisional Application No. 60/295,141 filed Jun. 1, 2001 entitled, "System and Method to Perform Non-Service Effecting Bandwidth Reservation Using a Reservation Signaling Protocol."

TECHNICAL FIELD OF THE INVENTION

The present invention relates generally to the field of telecommunications and more particularly to a system and method for non-service effecting bandwidth reservation.

BACKGROUND OF THE INVENTION

In existing communication networks, such as IP (Internet Protocol) based networks, when a faulty node in a communication path becomes operational again, it is not possible to restore the original communication path without effecting service to the customer. Thus, for example, assume that data is being transferred from source node A to destination node C via one or more intermediate nodes B. Further assume that one of the nodes, say node B, becomes faulty. When node B becomes non-operational, nodes A and C might time out node B and remove all references and connections to node B. An alternative communication path between nodes A and C that does not include node B is established.

In existing networks when node B becomes operational again it is not possible, without effecting service to the customer, to restore the communication path so that node A starts sending data to node C via node B. Thus, a desired Quality of Service (QoS), for example as specified in a Service Level Agreement (SLA) or a Service Level Specification (SLS) between the service provider and the customer is not maintained.

SUMMARY OF THE INVENTION

Accordingly, there is a need in the art for performing non-service effecting bandwidth reservation, such as E-LSP (Explicit Label Switched Path) bandwidth reservation, in a network, such as an IP network, for example an IP MPLS (Multi-Protocol Label Switching) network, using a reservation signaling protocol, such as RSVP-TE (Resource Reservation Protocol—Traffic Engineering). In the preferred embodiment, one or more of the messages used in RSVP-TE, such as path and resV messages, are utilized to facilitate recovery of a control element, such as a DPU (Data Processing Unit), without effecting customer traffic. Thus, a desired QoS, for example as specified in a SLA or a SLS between the service provider and the customer, is maintained.

Thus, the original state of the network may be restored, for example, connectivity between the different control elements and/or bandwidth reservation is restored.

In accordance with an embodiment of the present invention, a method to facilitate recovery of a node in a communications network is disclosed. The method comprises receiving one or more messages from at least another node in the communications network and restoring connectivity of a recovering node based at least in part on the received messages.

In accordance with another embodiment of the present invention, a method for facilitating recovery of a node in a communications network is disclosed. The method comprises receiving a confirmation message from a destination node in a communications network via one or more intermediate nodes, wherein the confirmation message includes a first data object; processing at least part of the information contained in the first data object; generating a second data object based at least in part on the processed information; and transmitting the second data object to the destination node via the intermediate nodes, wherein the second data object is transmitted as part of a path message.

Other aspects and features of the invention will become apparent to those ordinarily skilled in the art upon review of the following description of specific embodiments of the invention in conjunction with the accompanying figures.

BRIEF DESCRIPTION OF THE DRAWINGS

For a more complete understanding of the present invention, the objects and advantages thereof, reference is now made to the following descriptions taken in connection with the accompanying drawings in which:

FIG. 4 is a flowchart of a method for recovery at an intermediate node according to a preferred embodiment of the present invention;

FIG. 5 is a flowchart of a method for recovery at a tailend node according to a preferred embodiment of the present invention.

DETAILED DESCRIPTION OF THE DRAWINGS

The preferred embodiment of the present invention and its advantages are best understood by referring to FIGS. 1 through 6 of the drawings.

Figure 1:
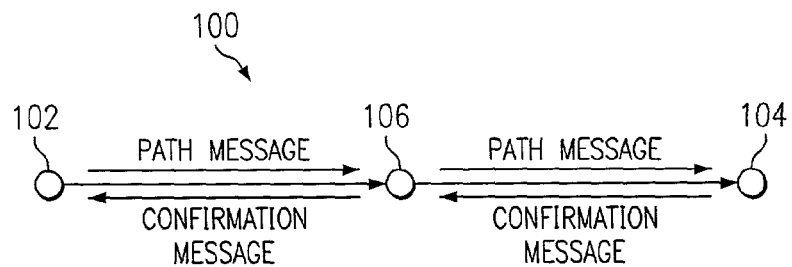
FIG. 1 shows a schematic diagram of a network.

FIG. 1 shows a schematic diagram of a communications network 100. Network 100 is preferably an IP MPLS network and utilizes a signaling protocol, for example RSVP-TE protocol. Network 100 comprises a plurality of nodes, for example, headend node 102, tailend node 104 and one or more intermediate nodes 106. Headend node 102 is preferably an ingress Label Edge Router (LER) and tailend node 104 is preferably an egress LER. Intermediate node(s) 106 are preferably Label Switch Router (LSR).

An ingress LER is an MPLS edge node and handles traffic as it enters an MPLS domain. An egress LER is an MPLS edge node and handles traffic as it leaves the MPLS domain. Each of the LSR nodes is aware of MPLS control protocols and operates one or more routing protocols. Preferably, it is capable of forwarding packets based on labels.

When a control element, such as a DPU, at headend node 102 desires to establish a communication path with tailend node 104 in order to allow headend node 102 to send data to tailend node 104, headend node 102 transmits a path message used in RSVP-TE to tailend node 104 via one or more intermediate nodes 106. Tailend node 104 sends a confirmation message, such as a resV message used in RSVP-TE, to headend node 102 via one or more intermediate nodes 106. Once headend node 102 receives the confirmation message it knows that the communication path between headend node 102 and tailend node 104 has been established and that it can start sending data to tailend node 104 via one or more intermediate nodes 106.

Under the RSVP-TE protocol, headend node 102 periodically sends the path message to tailend node 104 via intermediate node(s) 106. Tailend node 104 also periodically sends the resV message to headend node 102 via intermediate node(s) 106. The transmission of the path and resV messages are independent of each other.

Assume that one of the nodes, say headend node 102, experiences a fault and becomes non-operational. In such a case, headend node 102 will not be able to send path messages to the other nodes, for example tailend node 104 and intermediate node(s) 106. In the prior art, when headend node 102 becomes operational again, it does not have enough information to allow it to reestablish the connectivity to tailend node 104 via one or more intermediate nodes 106. Thus, in the prior art, tailend node 104 and intermediate node(s) 106 will time out headend node 102 if they do not receive the path message from headend node for a particular time.

In the preferred embodiment of the present invention, the signaling protocol, such as the RSVP-TE protocol, is extended such that connectivity of the network may be restored when a node that had become faulty becomes operational again. Preferably, the timer is made large enough so that the nodes are not easily timed out. Upon becoming operational a previously faulty node may reconstruct one or more messages, such as a path message and/or a resV message, based at least in part on messages received from one or more other nodes in the network that were part of the original communication path thereby providing non-service effecting bandwidth reservation.

Thus, for example, when the headend node becomes operational again it receives a confirmation message, for example a resV message, from the tailend node through one or more intermediate nodes. The resV message includes enough information to facilitate the headend node in reconstructing the path message that it sent out prior to becoming non-operational. The newly constructed path message may be sent to tailend node via one or more intermediate nodes thereby allowing the recovery of the original communication path between headend node and tailend node.

When a faulty tailend node becomes operational again it receives a path message from headend node through one or more intermediate nodes. The path message includes enough information to facilitate the tailend node in reconstructing the confirmation message, for example the resV message, that it sent out prior to becoming non-operational. The newly constructed confirmation message may be sent to headend node via one or more intermediate nodes thereby allowing the recovery of the original communication path between headend node and tailend node.

When a faulty intermediate node becomes operational again it receives a path message from headend node and a confirmation message from the tailend node. The path message and the confirmation message include enough information to facilitate recovery of the connection between the intermediate node and the headend node and the intermediate node and the tailend node.

Figure 2:
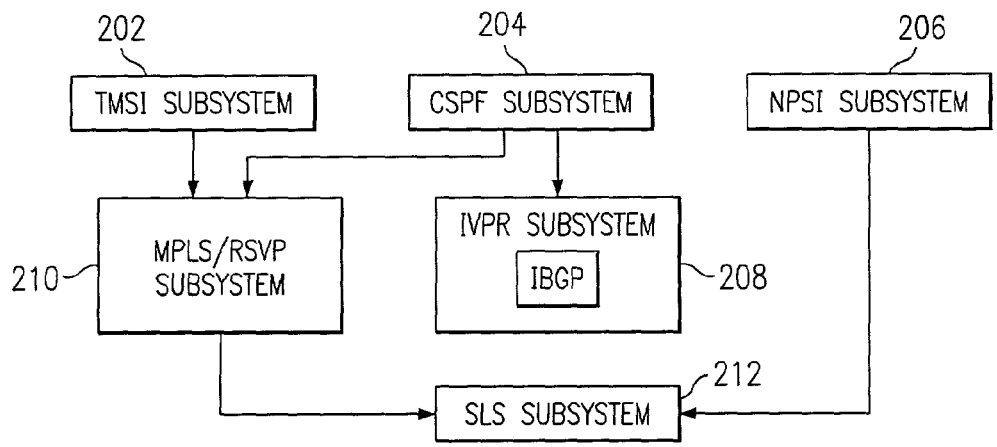
FIG. 2 shows the recovery sequence for different subsystems of a node according to a preferred embodiment of the present invention.

FIG. 2 shows the recovery sequence for different subsystems of a node according to a preferred embodiment of the present invention. Each node includes one or more of the following subsystems: TMSI (Traffic Management System Interface), CSPF (Constraint Shortest Path First), NPSI (Network Processor System Interface), IBGP (Internal Border Gateway Protocol), IVPR (Internal Virtual Private Router), MPLS/RSVP, SLS and/or the like. In general in the preferred embodiment, every subsystem within a node is responsible for its own recovery. However, there might be dependencies in the recovery of the different subsystems.

As illustrated in FIG. 2, in the preferred embodiment recovery attempts of TMSI subsystem 202, CSPF subsystem 204 and NPSI subsystem 206 may proceed concurrently. The recovery attempt of IBGP inside IVPR subsystem 208 begins after recovery of CSPF subsystem 204 finishes. The recovery attempt of MPLS/RSVP subsystem 210 begins after TMSI subsystem 202 and CSPF subsystem 204 complete their recovery. The recovery attempts of SLS subsystem 212 begins after MPLS/RSVP subsystem 210 and NPSI subsystem 206 complete their recovery. If desired, other recovery sequences may be used based on the underlying software architecture.

The preferred embodiment of the present invention may be used in the following cases: active DPU fault with standby DPU and/or active DPU software restart/reset without standby DPU. Preferably, in both cases service will not be effected during recovery. The MPLS/RSVP subsystem recovery is preferably started without receiving any information from the active control element, for example the active DPU that took over the role of the faulty DPU. During the recovery process it is desirable to restore all the LSP's and Vflows or connections.

Figure 3:
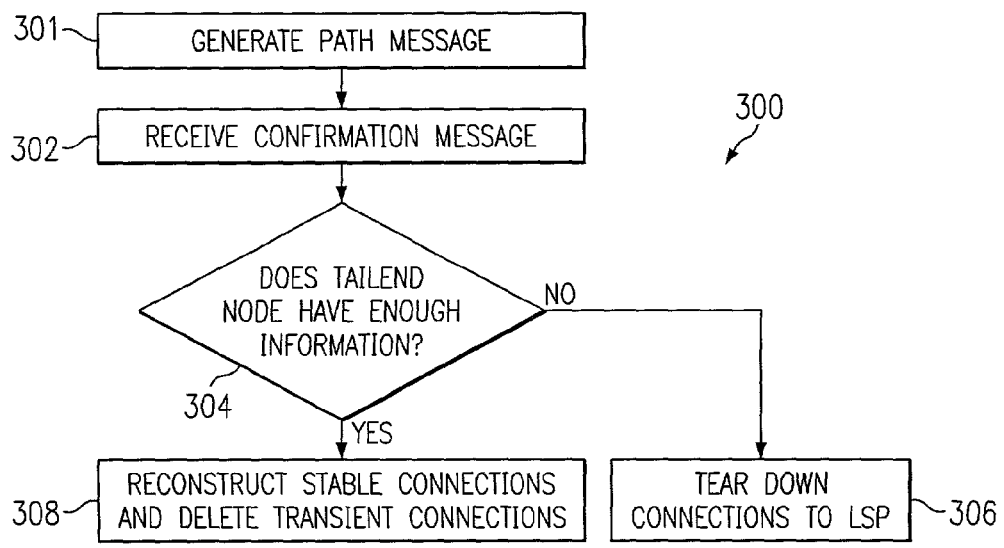
FIG. 3 is a flowchart of a method for recovery at a headend node according to a preferred embodiment of the present invention.

FIG. 3 is a flowchart 300 of a method for recovery at a headend node according to a preferred embodiment of the present invention. The headend node is primarily responsible to issue the path message in order to maintain the RSVP session. In step 301, a path message is generated by the headend node. The path message preferably has the same RSVP session information for the nodes that are downstream from it, for example one or more LSR nodes and the tailend node. The headend node includes a Line Forward Information Base (LFIB) which is a memory element and survives DPU switch overs and restarts. The LFIB is preferably part of the line card from which the path message is egressing. Relevant information is stored in the LFIB. Such relevant information includes information that is desirable to generate the path message. Preferably, the LFIB includes information about the destination IP address (preferably 32 bits), the LSP tunnel ID (preferably 16 bits), and egress port ID (preferably 8 bits). If desired, the LFIB may store other information. The destination IP address is preferably the IP address of the tailend node. The LSP tunnel ID is preferably an ID for an LSP to an intermediate node. The egress port ID is the ID of the port through which the data leaves the headend node.

The path message includes a special opaque object indicating a restart recovery. Preferably there are no ERO (Explicit Route Object) objects in the path message. The intermediate nodes along the original path are responsible for remembering the original next hop so that the path message may be forwarded to the tailend node via the intermediate nodes.

In step 302 a confirmation message, such as a resV message, is received preferably from the tailend node via one or more intermediate nodes. In step 304 a determination is made as to whether the confirmation message received from the tailend node includes enough information to allow the headend node to restore connectivity. Preferably, a determination is made as to whether the resV message includes an opaque object. An absence of an opaque object in the resV message indicates that the tailend node is also restarting and connectivity of the headend node cannot be established. Accordingly, in step 306, connections to the LSP are torn down. The recovery of headend node is postponed until an SLS audit operation. The LFIB entries corresponding to the LSP are also preferably cleared.

In step 308, upon receiving a resV message with one or more opaque objects, stable connections on the LSP are reconstructed and transient connections are deleted. The stable connections are stored in a data structure associated with the headend node. Thus, for example, Vflow entries which are marked "No Op" are kept. A "No Op" status indicates the connection has been established.

Vflow entries which are marked "Failed" for Vflow addition are deleted. A Vflow addition which is marked as failed indicates that the connection the headend node requested to be established prior to becoming faulty was not established. Hence, such a Vflow entry is deleted. The headend node also preferably issues a delete command for the particular Vflow to the downstream nodes. When a downstream node receives the delete command, the downstream node determines whether it has knowledge about the particular Vflow. If it does, then it deletes the particular Vflow and transmits the delete command to other downstream nodes. If it does not have knowledge about the particular Vflow, it transmits the delete command to other downstream nodes.

Vflow entries which are marked "Failed" for Vflow deletion are kept. A Vflow deletion which is marked as failed indicates that the particular Vflow the headend node requested to be deleted prior to becoming faulty was not deleted. Hence, such a Vflow entry is kept as it is desirable to delete the Vflow. The headend node keeps sending the Vflow delete command until a "Success" for Vflow deletion is received.

Vflow entries which are marked "Failed" for Vflow modification are kept. A Vflow modification, say for example a Vflow bandwidth modification, which is marked as failed indicates that the Vflow modification failed one or more nodes. Hence, such a Vflow entry is kept so that the Vflow modification may be executed during a subsequent SLS audit operation.

Vflow entries which are marked "Success" for Vflow addition are changed to "Delete". A Vflow addition which is marked as success indicates that the particular add was successful. However, the add is a transient add and the headend cannot handle the new egress Vflow ID. Hence, such a Vflow entry is changed to a "delete".

Vflow entries which are marked "Success" for Vflow deletion are deleted. Vflow entries which are marked "Success" for Vflow modification are changed to "No Op". The ingress policer for this type of Vflow is preferably not changed.

After processing of the received opaque object(s), new opaque objects are constructed for the path message. Information desired to be kept is added to the newly created opaque object. Thus, a resV_info block is preferably created for each Vflow in the processed opaque object which is marked as "No Op" or "Modify".

If an RRO (Record Route Object) is received in the resV message, then a Default Fault Manager of the LSP is also updated.

FIG. 4 is a flowchart 400 of a method for recovery at an intermediate node according to a preferred embodiment of the present invention. In step 402, a confirmation message, for example a resV message, is received preferably from the tailend node. The resV message includes information, such as session number, which facilitates the determination of the downstream label and the downstream IfIndex (Interface Index), for example the labels and IfIndex for nodes between the intermediate node and the tailend node, preferably by the intermediate node. Once the resV message is received, the intermediate node performs one or more of the following tasks: upstream label allocation and opaque object processing.

Thus, in step 404, the LFIB is searched to determine the upstream label, for example the labels for nodes between the particular intermediate node and the headend node. If the label is found, then the label is included in the label field of the resV message (steps 406 and 408) and the resV message transmitted to the upstream node. If the label is not found, then the intermediate node issues a pathTear message for downstream nodes and a resVTear message for upstream nodes (steps 406 and 410). Thus, all connections both upstream and downstream from the particular intermediate node are torn apart.

The resV message preferably includes one or more opaque objects. Information desired to be kept is added to the newly created opaque object. Thus, a resV_info block is preferably created for each Vflow in the opaque object which is marked as "No Op". Vflow deletion requests in the received opaque objects are marked as "Success" by the recovering node and forwarded upstream. Also preferably both the Vflow addition and Vflow modification requests are marked as "Failure" by the recovering node.

Opaque objects in future resV messages for the particular LSP before full recovery of the MPLS/RSVP subsystem are preferably processed as follows. For a Vflow marked as "No Op" there is no change. For a Vflow deletion, mark "Success" for the Vflow deletion request if there is no resV_info. For a Vflow deletion if there is resV_info, mark "Success" for the Vflow deletion request and remove bandwidth requirement from the link involved. Mark "fail" for a Vflow addition not already marked as "failed". Mark "fail" for a Vflow modification not already marked as "failed".

Upon receiving a path message, the intermediate node creates a corresponding path state for the path message. The path state may be used by the intermediate node, for example to determine where to send information in the future. A lack of any ERO objects in the path message indicates that the headend node is in the process of restarting and a resVTear message is issued for the upstream nodes.

FIG. 5 is a flowchart 500 of a method for recovery at a tailend node according to a preferred embodiment of the present invention. In step 502 a path message is received preferably from the headend node via one or more intermediate nodes. If the path message includes one or more opaque objects indicating that the headend node from which the path message has been received is in the restart mode, then a resVTear message is issued for upstream nodes (steps 504 and 506).

In the path message does not include one or more opaque objects indicating that the headend node from which the path message has been received is in the restart mode, then one or more opaque objects included in the received path message are processed to generate a confirmation message, for example a resV message (steps 504 and 508). The LFIB is searched to determine the label of the nodes that are upstream from the tailend node, for example, one or more intermediate nodes and the headend node.

The resV message preferably includes one or more opaque objects. Information desired to be kept is added to the newly created opaque object. Thus, a resV_info block is preferably created for each Vflow in the opaque object which is marked as "No Op". Preferably, the same egress Vflow ID as that received on the path message is used. Vflow deletion requests are preferably marked as "fail". This avoids hardware access from the NPSI subsystems so that MPLS/RSVP and NPSI subsystems can recover at the same time. Also preferably both the Vflow addition and Vflow modification requests are marked as "Failure". Thus, the data structure at the tailend node is reconstructed from the path message.

The end of the recovery of any of the headend node, the intermediate node(s) and the tailend node is indicated when no new resV messages is received by the recovering node preferably for two resV periods. For this purpose an existing resV message which has been modified is not treated as a new resV message.

Before the end of the recovery of MPLS/RSVP subsystem, the traffic manager at the line card are programmed according to per link bandwidth information. All unaccounted entries in the LFIB are also cleared.

Figure 6:
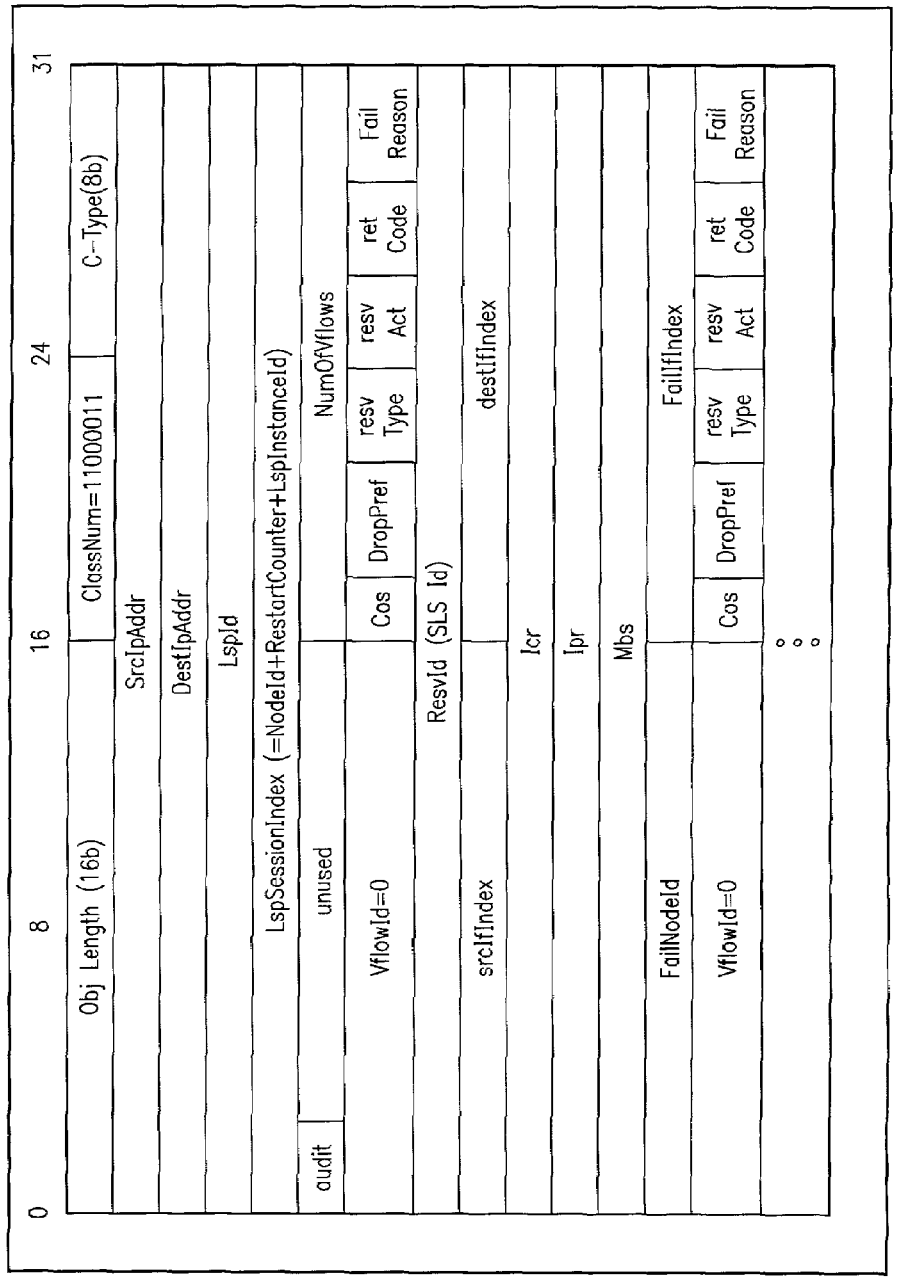
FIG. 6 shows the structure of an opaque object according to a preferred embodiment of the present invention.

FIG. 6 shows the structure of an opaque object 600 according to a preferred embodiment of the present invention. Opaque object 600 includes one or more fields as described below. The SrcIpAddr field identifies the IP address of the headend node; the DestIpAddr identifies the IP address of the tailend node; and the LspId field identifies the intermediate node. The Audit field indicates whether an audit is to be performed or not. Thus, for example, a 0 in the audit field indicates an audit is not to be performed and a 1 in the audit field indicates that an audit is to be performed.

The NumOfVflows field indicates the number of Vflows in the particular object. Each Vflow has a separate block in the opaque object structure. The Cos field which is preferably 3 bits long indicates the Quality of Service (QoS) for the particular Vflow. The resv Act field which is preferably 2 bits long indicates the reservation activity. Thus, for example, a 0 in the resv Act field indicates no operation needed for this Vflow, a 1 indicates an addition, a 2 indicates a modification and 3 indicates a deletion. The ret Code field, which is preferably 2 bits long indicates the result of the reservation activity. Thus, for example, a 0 in the ret Code field indicates a successful action and a 1 in the ret Code field indicates a failed action. Opaque object structure 600 also preferably includes a plurality of QoS parameters, such as Ingress Committed Rate (ICR), Ingress Peak Rate (IPR), Maximum Burst Size (MBS), and/or the like.

An advantage of a preferred embodiment of the present invention is that connectivity of a node may be restored without effecting service to the customer.

While the invention has been particularly shown and described by the foregoing detailed description, it will be understood by those skilled in the art that various other changes in form and detail may be made without departing from the spirit and scope of the invention.

What is claimed is:

1. A method to facilitate recovery of a communication session in a packet communications network involving communication flow though a plurality of nodes, the plurality of nodes including a first node, and at least one other node in the packet communications network, the communication session defining at least one data flow and path through the packet communications network, said method comprising:

receiving one or more signaling messages in the path from the at least one other node in said plurality of nodes of said packet communications network, the one or more signaling messages being periodically sent between nodes of said plurality of nodes for maintaining the communications session, the one or more signaling messages further including information for enabling the first node to recover the state of the communication session after recovery from a fault without establishing a new communication session that would include at least one node that is not one of said plurality of nodes of said communications network; and restoring the communication session at the first node after recovery from a fault such that communication flow is restored through said plurality of nodes based at least in part on the information in said one or more signaling messages received from said at least one other node after restoration of the first node.

2. The method of claim 1, wherein said communications network comprises an Internet Protocol (IP) network.

3. The method of claim 1, wherein said network comprises label switching network, and wherein the path is a label switched path.

4. The method of claim 1, wherein said one or more signaling messages are part of a protocol for reserving resources through the packet communications network for a communication session.

5. The method of claim 4, wherein said protocol includes a RSVP-TE (Resource Reservation Protocol—Traffic Engineering) signaling protocol.

6. The method of claim 1, wherein said first node is a headend node and said at least one other node is a tailend node of the path.

7. The method of claim 6, further comprising constructing at the headend node a message for sending along the path to the tailend node based at least in part on said one or more signaling messages received from said tailend node.

8. The method of claim 7, further comprising transmitting said message from the headend node to said tailend node via one or more intermediate nodes.

9. The method of claim 1, wherein said first node is a tailend node and said at least another node is a headend node of the path.

10. The method of claim 9, further comprising constructing a message for requesting reservation of resources along the path, based at least in part on said one or more messages received from said headend node.

11. The method of claim 10, farther comprising transmitting said message for requesting reservation of resources for the communication session to said headend node via one or more intermediate nodes.

12. The method of claim 1, wherein said first node is an intermediate node, wherein said intermediate node receives one or more messages from a headend node of a path associated with the communication session and one or more message from a tailend node of the path.

13. The method of claim 1, wherein said one or more messages are selected from the group consisting of messages of a protocol for reserving messages along a path associated with the communication session.

14. The method of claim 1, wherein the first node includes a headend node and the at least one other node includes a tailend node, the headend node storing a information base containing at least a destination address of the tailend node, and wherein the method further includes upon restarting of the headend node transmitting to the tailend node a message for maintaining the communication session using the information stored in the information base.

15. The method of claim 14 further comprising determining the state of the tailend node based on the one or more signaling messages and initiating a tear down of the communication session if the one or more signaling messages indicates that the tailend node is recovering from a failure.

16. A node in a packet communications network, the node comprising:
- a control element for establishing or maintaining a communication session between a plurality of nodes in the communications network using in-band control signaling, the communication session defining at least one data flow and path through the packet communications network; and
- means for recovering a state of the communication session in the event the control element fails such that communication flow is restored through said plurality of nodes, the means for recovering including means for receiving one or more signaling messages sent within the path from another node of said plurality of nodes, the signaling message being of a type for maintaining the communication session and being periodically sent between nodes of said plurality of nodes, the one or more signaling messages including information for enabling the node to recover the state of the communication session after recovery from a fault without establishing a new communication session that would include at least one node that is not one of said plurality of nodes in said communications network.

17. The node of claim 16, wherein the path includes a label-switched path.

18. The node of claim 16, wherein the one or more in band messages arc part of a protocol for reserving resources through the network for a communication session.

19. The node of claim 18, wherein the one or more signaling messages are predefined messages according to the protocol for establishing either a path through the network or for reserving resources along the path.

20. The node of claim 16 wherein the node includes a headend node, the headend node including an information base containing at least a destination address of a tailend node for the communications session, and wherein the node includes means for sending, upon restarting following a failure of the control element, to the tailend node a message for maintaining the communication session using information stored in the information base.

21. The node of claim 20 further comprising means for determining the state of the tailend node based on the one or more signaling messages and initiating a tear down of the communication session if the one or more signaling messages indicates that the tailend node is recovering from a failure.

22. The node of claim 20 wherein the node includes a node intermediate of a headend node and a tailend node in the path of the communication session, the intermediate node including means for looking up, after restarting of the failed control element, forwarding information based on the one or more signaling messages, forwarding the one or more messages if forwarding information, and generating a session tear down message for tearing down the communication session if no forwarding information is found.

* * * * *